United States Patent [19]

Maier

[11] Patent Number: 4,903,721
[45] Date of Patent: Feb. 27, 1990

[54] FUEL PRESSURE REGULATOR

[75] Inventor: Gerhard A. Maier, Mundelein, Ill.

[73] Assignee: Outboard Marine Corporation, Waukegan, Ill.

[21] Appl. No.: 719,586

[22] Filed: Apr. 3, 1985

[51] Int. Cl.$^4$ .................. F16K 17/36; F16K 31/12; F02M 39/00

[52] U.S. Cl. ................... 137/811; 137/510; 123/463

[58] Field of Search ............ 137/510, 81.1, DIG. 8, 137/78.5, 907; 123/510, 511, 512, 514, 459, 463

[56] References Cited

U.S. PATENT DOCUMENTS

| | | | |
|---|---|---|---|
| 1,955,037 | 4/1934 | Viel | 123/463 |
| 2,326,825 | 8/1943 | Bucknam | 137/81.1 |
| 2,437,187 | 3/1948 | Eshbaugh | 137/81.1 |
| 2,618,290 | 11/1952 | Van Vliet | 137/510 |
| 2,706,885 | 4/1955 | Ostroff | 137/81.1 X |
| 2,809,708 | 10/1957 | Edwards | 137/510 X |
| 2,819,774 | 1/1958 | Schmidt | 137/510 X |
| 3,511,270 | 5/1970 | Fehrenbach | 251/86 X |
| 3,797,803 | 3/1974 | Goto | 137/DIG. 8 X |

FOREIGN PATENT DOCUMENTS

| | | | |
|---|---|---|---|
| 501138 | 2/1939 | United Kingdom | 137/81.1 |
| 957118 | 5/1964 | United Kingdom | 137/DIG. 8 |

*Primary Examiner*—Martin P. Schwadron
*Attorney, Agent, or Firm*—Michael, Best & Friedrich

[57] ABSTRACT

A fuel pressure regulator comprising a housing, a movable diaphragm mounted within the housing, the diaphragm including a first side communicating with the atmosphere and an opposite second side having first and second portions, a fuel chamber partially defined by the first portion of the second side of the diaphragm, a constant pressure chamber partially defined by the second portion of the second side of the diaphragm, a fuel inlet communicating with the fuel chamber, and a fuel outlet having an inlet end located adjacent the diaphragm within the fuel chamber and being selectively communicable with the fuel chamber in response to movement of the diaphragm relative to the inlet end.

20 Claims, 2 Drawing Sheets

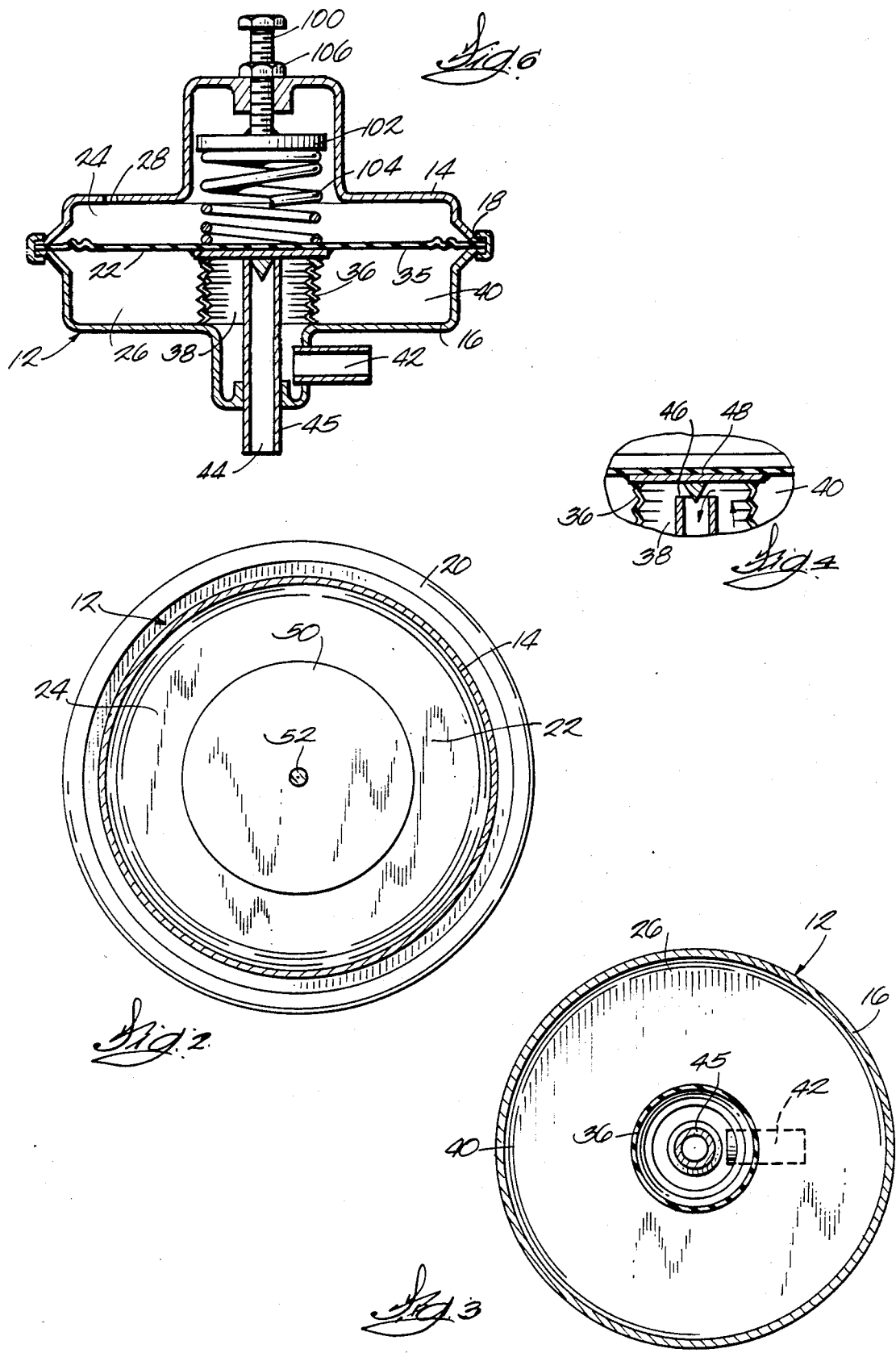

FUEL PRESSURE REGULATOR

BACKGROUND OF THE INVENTION

The invention relates to fuel injection systems for internal combustion engines, and more particularly to pressure regulators in fuel injection systems.

A typical fuel injection system includes a source of fuel, a fuel injector, a pump for pumping fuel from the source to the fuel injector, a return line from the fuel injector to the source, and a pressure regulator in the return line between the fuel injector and the source of fuel. The pressure regulator controls the fuel pressure at the fuel injector.

Prior fuel pressure regulators maintain a constant absolute pressure (system pressure) or a constant pressure difference relative to a reference pressure, such as atmospheric pressure or intake manifold absolute pressure.

In prior fuel pressure regulators, the fuel pressure is often too high in conditions of low ambient air pressure, and is often too low in conditions of high ambient air pressure, so that a proper air/fuel ratio is not maintained.

Attention is directed to the following U.S. patents which disclose pressure regulators:

| Hamilton | 3,752,175 | August 14, 1973 |
| Ludwig | 4,204,561 | May 27, 1980 |
| Amey | 4,164,237 | August 14, 1979 |
| Atkins | 4,436,112 | March 13, 1984 |
| Fehrenbach | 4,431,026 | February 14, 1984 |
| Brettschneider | 4,395,986 | August 2, 1983 |
| Sasaki | 4,370,102 | January 25, 1983 |
| Ciaccio | 4,357,921 | November 9, 1982 |
| Fehrenbach | 4,327,767 | May 4, 1982 |
| Ishida | 4,300,510 | November 17, 1981 |
| Bellicardi | 4,284,039 | August 18, 1981 |
| Benjamin | 4,237,924 | December 9, 1980 |
| Ohumi | 4,231,347 | November 4, 1980 |
| Rissi | 4,203,465 | May 20, 1980 |
| Bauer | 3,971,409 | July 27, 1976 |
| Weber | 3,662,779 | May 16, 1972 |
| Fehrenbach | 3,511,270 | May 12, 1970 |
| Baumann | 3,405,730 | October 15, 1968 |
| Teston | 3,106,219 | October 8, 1963 |
| Howard | 3,048,185 | August 7, 1962 |
| Young | 3,045,691 | July 24, 1962 |
| Lipkins | 2,998,256 | August 29, 1961 |
| Elder | 2,939,480 | June 7, 1960 |

SUMMARY OF THE INVENTION

The invention provides a fuel pressure regulator comprising a housing, a movable diaphragm mounted within the housing, the diaphragm including a first side communicating with the atmosphere and an opposite second side having first and second portions, a fuel chamber partially defined by the first portion of the second side of the diaphragm, a constant pressure chamber partially defined by the second portion of the second side of the diaphragm, fuel inlet means communicating with the fuel chamber, and fuel outlet means including an outlet conduit having an inlet end located adjacent the diaphragm within the fuel chamber and being selectively communicable with the fuel chamber in response to movement of the diaphragm relative to the inlet end.

In one embodiment, the pressure regulator further comprises interengageable valve means on the inlet end of the outlet conduit and on the second side of the diaphragm for closing the outlet conduit when the diaphragm is biased toward the outlet conduit, and for opening the outlet conduit to the fuel chamber when the diaphragm is biased away from the outlet conduit.

In one embodiment, the pressure regulator further comprises means for varying the pressure of fuel in the fuel chamber independently of atmospheric pressure.

In one embodiment, the fuel pressure varying means includes means for applying a force to the diaphragm so as to bias the diaphragm away from the outlet conduit.

In one embodiment, the fuel pressure varying means includes means for applying a force to the diaphragm so as to bias the diaphragm toward the outlet conduit.

In one embodiment, the means for applying a force to the diaphragm includes a spring.

In one embodiment, the pressure regulator further comprises means for varying the value of the force applied to the diaphragm.

In one embodiment, the housing and the second side of the diaphragm define a chamber, and the pressure regulator further comprises wall means extending between the housing and the second side of the diaphragm and dividing the chamber into a radially inner chamber forming the fuel chamber and a radially outer chamber forming the constant pressure chamber.

In one embodiment, the constant pressure chamber is a vacuum chamber.

The invention also provides a fuel pressure regulator comprising a housing, a movable diaphragm including first and second portions and being mounted within the housing so as to divide the housing into first and second chambers, the first chamber communicating with the atmosphere, a flexible bellows extending between the housing and the diaphragm in the second chamber and dividing the second chamber into a fuel chamber within the bellows and a constant pressure chamber outside the bellows, the fuel chamber being partially defined by the first portion of the diaphragm, and the constant pressure chamber being partially defined by the second portion of the diaphragam, fuel inlet means communicating with the fuel chamber, fuel outlet means including an outlet conduit having an inlet end located adjacent the diaphragm within the fuel chamber, interengageable valve means on the inlet end of the outlet conduit and on the diaphragm for closing the outlet conduit when the diaphragm is biased toward the outlet conduit, and for opening the outlet conduit to the fuel chamber when the diaphragm is biased away from the outlet conduit, and means for varying the pressure of fuel in the fuel chamber independently of atmospheric pressure.

In one embodiment, the fuel presure varying means includes means for applying a force to the diaphragm so as to bias the diaphragm toward the outlet conduit.

In one embodiment, the housing has an exterior, and the means for applying a force to the diaphragm includes a rod having one end connected to the diaphragm in the first chamber, and an opposite end extending outwardly of the housing for reciprocal movement relative to the housing, and a spring positioned between the exterior of the housing and the opposite end of the rod for biasing the opposite end of the rod away from the exterior of the housing.

In one embodiment, the means for applying a force to the diaphragm includes a spring positioned between the housing and the diaphragm in the first chamber for biasing the diaphragm away from the fuel outlet conduit.

The invention also provides a fuel pressure regulator comprising a housing forming a chamber and having opposite first and second generally closed ends, a movable diaphragm including opposite first and second sides each having an area $A_D$, the second side of the diaphragm including a radially inner portion having an area $A_F$, and a radially outer portion, the diaphragm being mounted within the housing and dividing the housing into first and second chambers, the first chamber being located between the first side of the diaphragm and the first end of the housing and communicating with the atmosphere so that the first chamber is at atmospheric pressure $P_A$, the second chamber being located between the second side of the diaphragm and the second end of the housing, a flexible bellows extending between the second end of the housing and the second side of the diaphragm and dividing the second chamber into a radially inner fuel chamber within the bellows and a radially outer constant pressure chamber outside the bellows, the fuel chamber being partially defined by the radially inner portion of the second side of the diaphragm, and the constant pressure chamber being partially defined by the radially outer portion of the second side of the diaphragm, fuel inlet means communicating with the fuel chamber, fuel outlet means including an outlet conduit having an inlet end located adjacent the diaphragm within the fuel chamber, interengageable valve means on the inlet end of the outlet conduit and on the diaphragm for closing the outlet conduit when the diaphragm is biased toward the outlet conduit, and for opening the outlet conduit to the fuel chamber when the diaphragm is biased away from the outlet conduit, and means for applying a force F to the diaphragm so as to bias the diaphragm away from the fuel outlet conduit, whereby fuel flowing into the fuel chamber through the fuel inlet means flows out of the fuel chamber through the fuel outlet conduit when the pressure of the fuel in the fuel chamber is greater than $P_A A_D/A_F - F/A_F$.

A principal feature of the invention is the provision of a fuel pressure regulator for fuel injection systems which varies the system pressure almost ideally in response to changes in ambient or atmospheric pressure so that the fuel injection nozzles spray more or less fuel in response to higher or lower ambient or atmospheric pressure in order to maintain a constant air to fuel ratio.

Another principal feature of the invention is the provision of a fuel pressure regulator comprising a housing, a movable diaphragm mounted within the housing, the diaphragm including a first side communicating with the atmosphere and an opposite second side having first and second portions, a fuel chamber communicating with the first portion of the second side of the diaphragm, and a constant pressure chamber communicating with the second portion of the second side of the diaphragm.

Other features and advantages of the invention will become apparent to those skilled in the art upon review of the following detailed description, claims, and drawings.

DESCRIPTION OF THE DRAWINGS

FIG. 2 is a cross-sectional view taken along line 2—2 in FIG. 1.

FIG. 3 is a cross-sectional view taken along line 3—3 in FIG. 1.

FIG. 4 is a partial, vertical cross-sectional view similar to FIG. 1 showing the valve member unseated from the valve seat.

FIG. 6 is a view similar to FIG. 1 showing an alternative embodiment of the invention.

Figure 1:
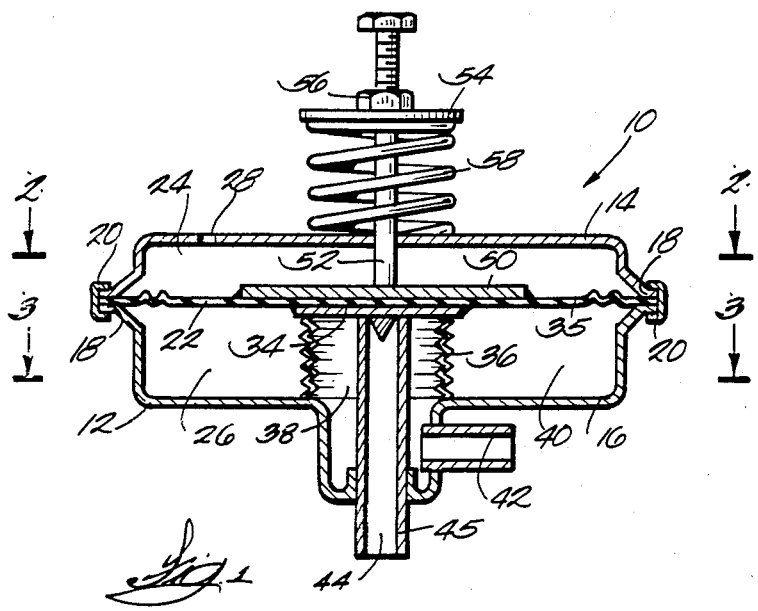
FIG. 1 is a vertical cross-sectional view of a fuel pressure regulator embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A fuel pressure regulator 10 embodying the invention is illustrated in the drawings. As best shown in FIG. 1, the fuel pressure regulator 10 of the preferred embodiment comprises a housing 12 including a first or upper portion 14, and a second or lower portion 16 fixedly attached to the upper portion 14. The housing 12 has opposite first and second or upper and lower generally closed ends formed respectively by the upper and lower portions 14 and 16 of the housing 12. The two portions 14 and 16 of the housing 12 are generally circular in cross-section and can be connected together by any suitable means. In the preferred embodiment, the two portions 14 and 16 of the housing 12 each have outwardly extending flanges 18 clamped together by an annular C clamp 20. In an alternative embodiment, the flanges 18 could be crimped together, as is well known in the art.

The pressure regulator 10 further comprises a movable diaphragm 22 mounted within the housing 12 so as to divide the housing 12 into first and second or upper and lower chambers 24 and 26, respectively. The upper chamber 24 is located between the upper side of the diaphragm 22 and the upper end of the housing 12 and communicates with the atmosphere through an opening 28 in the upper portion 14 of the housing 12, so that the upper chamber 24 is at atmospheric pressure $P_A$. The lower chamber 26 is located between the lower side of the diaphragm 12 and the lower end of the housing 12. In the illustrated construction, the diaphragm 22 has an outer edge which is clamped between the flanges 18 of the housing portions. The diaphragm 22 has first and second or upper and lower sides each having an area $A_D$, and the lower side of the diaphragm 22 includes a radially inner portion 34 having an area $A_F$, and a radially outer portion 35.

The pressure regulator 10 further comprises a flexible bellows 36 extending between the lower end of the housing 12 and the lower side of the diaphragm 22 and dividing the lower chamber 26 into a radially inner fuel chamber 38 within the bellows 36, and a radially outer constant pressure chamber 40 outside the bellows 36. The fuel chamber 38 is partially defined by the radially inner portion 34 of the lower side of the diaphragm 22, and the remainder of the fuel chamber 38 is defined by the inside of the bellows 36 and the portion of the lower end of the housing 12 communicating with the inside of the bellows 36. The constant pressure chamber 40 is partially defined by the radially outer portion 35 of the lower side of the diaphragm 22, and the remainder of the constant pressure chamber 40 is defined by the outside of the bellows 36 and the portion of the lower end of the housing 12 communicating with the outside of the bellows 36.

In the preferred embodiment, the constant pressure chamber 40 is a vacuum chamber, i.e., is maintained at approximately zero absolute pressure, so that temperature does not affect the pressure in the chamber 40. In alternative embodiments, the constant pressure chamber 40 can be maintained at any constant pressure above zero, although this would require some means for compensating for temperature changes, since the pressure of a gas in a fixed volume (the constant pressure chamber) will vary with temperature.

The pressure regulator 10 further comprises fuel inlet means communicating with the fuel chamber 38. While various suitable fuel inlet means may be employed, in the preferred embodiment, the fuel inlet means includes a fuel inlet conduit 42 communicating with the fuel chamber 38 and being adapted to be connected to a fuel injector (not shown). The inlet conduit 42 fills the fuel chamber 38 with fuel which is at an absolute pressure $P_F$.

The pressure regulator 10 further comprises fuel outlet means including an outlet conduit 44 having an inlet end located adjacent the lower side of the diaphragm 22 within the fuel chamber 38, the outlet conduit 44 being selectively communicable with the fuel chamber 38 in response to movement of the diaphragm 22 relative to the inlet end of the outlet conduit 44. The outlet conduit 44 has an outlet end 45 adapted to return fuel to a source of fuel (not shown) or the fuel injector.

In the preferred embodiment, the pressure regulator 10 further comprises interengageable valve means on the inlet end of the outlet conduit 44 and on the lower side of the diaphragm 22 for closing the outlet conduit 44 when the diaphragm 22 is biased toward the outlet conduit 44, and for opening the outlet conduit 44 to the fuel chamber 38 when the diaphragm 22 is biased toward the upper chamber 24 or away from the outlet conduit 44. In the illustrated construction, the inlet end of the outlet conduit 44 forms a valve seat 46 (FIG. 4), and the lower side of the diaphragm 22 includes a valve member 48 engageable with the valve seat 46 for closing the outlet conduit 44. Preferably, the valve member 48 is a plate including a conical projection insertable into the inlet end of the outlet conduit 44. In FIG. 1, the valve member 48 is shown engaging the valve seat 46, and in FIG. 4, the valve member 48 is shown spaced apart from the valve seat 46 so that the outlet conduit 44 is open to the fuel chamber 38.

In the preferred embodiment, the flexible bellows 36 is connected between the lower end of the housing 12 and the valve member 48. Preferably, the flexible bellows 36 is made of spring steel and is plasma welded to the lower end of the housing 12 and to the valve member 48.

In the preferred embodiment, the pressure regulator 10 further comprises means for varying the pressure $P_F$ of the fuel in the fuel chamber 38 independently of atmospheric pressure. In the preferred embodiment, wherein the constant pressure chamber 40 is a vacuum chamber, this means includes means for applying a force F to the diaphragm 22 so as to bias the diaphragm upwardly away from the fuel outlet conduit 44. While various suitable means for applying the force can be used, in the preferred embodiment, this means includes a plate 50 fixedly attached to the upper side of the diaphragm 22 for movement therewith, and a rod 52 having a lower end fixedly attached to the plate 50, and an upper end extending outwardly of the upper end of the housing 12 for reciprocal movement relative to the housing 12. The biasing means further includes a plate 54 slidably mounted on the rod 52, a pressure adjustment nut 56 threaded onto the rod 52 for limiting upward movement of the plate 54 on the rod 52, and a compression spring 58 positioned between the exterior of the upper end of the housing 12 and the plate 54 for biasing the upper end of the rod 52 upwardly.

In an alternative embodiment (FIG. 6), the biasing means includes a pressure adjustment screw 100 threadably received in the upper end of the housing 12 and having a lower end extending into the upper chamber 24. The biasing means also includes a plate 102 fixedly attached to the lower end of the screw 100, and a tension spring 104 connected between and fixed to the plate 102 and the upper side of the diaphragn 22 for biasing the diaphragm 22 upwardly away from the fuel outlet conduit 44. A locking nut 106 serves to secure the pressure adjustment screw 100 in position relative to the housing 12.

In another alternative embodiment, wherein the constant pressure chamber 40 is at a constant pressure close to atmospheric pressure, the means for varying $P_F$ independently of atmospheric pressure includes means for biasing the diaphragm 22 downwardly toward the fuel outlet conduit 44. This means could be a construction similar to FIG. 6 wherein the spring 104 is a compression spring rather than a tension spring.

Preferably, the pressure regulator 10 further comprises means for varying the value of the force F applied to the diaphragm 22. In the preferred embodiment, the means for varying the force includes the pressure adjustment nut 56. By turning the pressure adjustment nut 56 so as to move it downwardly on the rod 52, the force exerted by the spring 58 on the diaphragm 22 is increased.

The pressure regulator 10 functions as follows. As explained above, the area of the upper side of the diaphragm 22 is $A_D$. Because the upper chamber 24 is in communication with the atmosphere, which is at pressure $P_A$, the atmosphere exerts a constant downward force on the upper side of the diaphragm 22 equal to $P_A A_D$. Therefore, the total downward force on the diaphragm 22 is equal to $P_A A_D$.

As explained above, the radially inner portion 34 of the lower side of the diaphragm 22, or the portion of the lower side of the diaphragm 22 in communication with the fuel chamber 38, has an area equal to $A_F$. Therefore, the fuel in the fuel chamber 38 exerts an upward force on the lower side of the diaphragm 22 equal to $P_F A_F$. The remainder of the lower side of the diaphragm 22 has an area $(A_D-A_F)$ and is subject to the constant pressure $P_C$ of the constant pressure chamber 40. This results in an additional upward force on the lower side of the diaphragm 22 equal to $P_C (A_D-A_F)$. Additionally, the spring 58 exerts an upward force on the upper side of the diaphragm 22 equal to F. Therefore, the total upward force on the diaphragm 22 is equal to $P_F A_F + P_C(A_D-A_F) + F$. In the preferred embodiment, wherein the constant pressure chamber 40 is a vacuum chamber, $P_C=0$, and the upward force on the diaphragm 22 is equal to $P_F A_F + F$.

As long as the downward force on the diaphragm 22 is greater than the upward force on the diaphragm 22, the valve member 48 will engage the valve seat 46 and the inlet end of the outlet conduit 44 will be closed. When the upward force on the diaphragm 22 exceeds the downward force on the diaphragm 22, the diaphragm 22 will move upwardly and the valve member 48 will move away from the valve seat 46 so that the fuel outlet conduit 44 is open to the fuel chamber 38. In other words, the fuel outlet conduit 44 is opened when $P_F A_F + F$ is greater than $P_A A_D$. Thus, fuel flowing into the fuel chamber 38 through the fuel inlet conduit 42 flows out of the fuel chamber 38 through the fuel outlet conduit 44 when $P_F$, the absolute pressure of the fuel in the fuel chamber 38, is greater than $P_A A_D / A_F - F / A_F$.

Accordingly, the fuel pressure regulator 10 maintains the absolute pressure of the fuel in the fuel chamber 38, and thus in the fuel injection system, at a pressure approximately equal to $P_A A_D / A_F - F / A_F$. When the fuel pressure falls below this value, the outlet conduit 44 is enclosed, and the fuel pressure in the fuel chamber 38 builds up until it is once again greater than the above mentioned value. In operation, the diaphragm 22 actually vibrates up and down very rapidly, and the absolute pressure of the fuel in the fuel chamber 38 is maintained at an almost constant value equal to $P_A A_D / A_F - F / A_F$. This means that the fuel is maintained at a gauge pressure $P_{FG}$ of $P_A A_D / A_F - F / A_F - P_A$.

As is well known in the art, the ideal gauge fuel pressure (psig) for a fuel injector, and therefore for the fuel pressure regulator 10, is equal to $P_0 (P_A/BP_0)^2$, where $P_0$ is nominal fuel pressure, and $BP_0$ is standard barometric pressure. Assuming $P_0$ equals 50 psig, and $BP_0$ equals 14.5 psia, $P_{FG}$ equals 0.238 $(P_A)^2$ psig, where $P_A$ is in psia. This curve is shown as a dotted line in FIG. 5. As an example, when $P_A$ equals 14.64 psia, $P_{FG}$ equals 50.97 psig.

Figure 5:
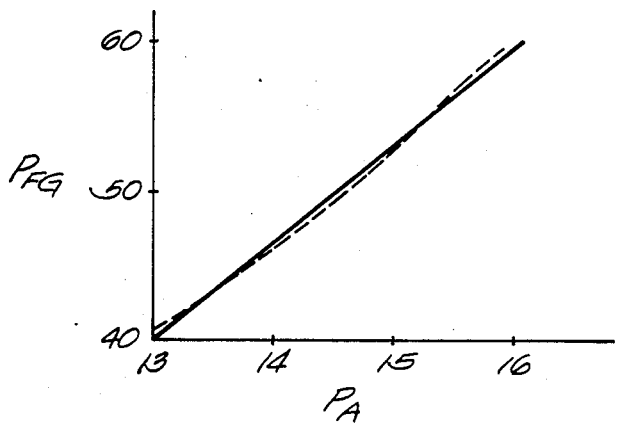
FIG. 5 illustrates two curves showing ideal fuel pressure relative to atmospheric pressure (dotted line), and the fuel pressure provided by the pressure regulator of the invention (solid line).

In the preferred embodiment, the diaphragm 22 has a diameter of 3.94 in., and the radially inner portion 34 of the lower side of the diaphragm 22 has a diameter of 1.41 in. Therefore, $A_D/A_F = 7.81$, and $P_{FG} = (7.81 P_A - F/A_F - P_A)$ psig. Since F and $A_F$ are constants, $P_{FG}$ varies directly with $P_A$. If $F = 76$ lbs., then $P_{FG} = (6.81 P_A - 48.67)$ psig, where $P_A$ is in psia. This curve is shown with a solid line in FIG. 5. As seen in FIG. 5, the curve of the pressure regulator 10 of the invention is very close to the ideal curve over the range of normal atmospheric pressures. For example, when $P_A$ equals 14.64 psia, $P_{FG}$ equals 51.00 psig.

Thus, it can be seen from the above that the pressure regulator 10 of the invention provides a fuel pressure which varies almost ideally with atmospheric pressure.

Various features and advantages of the invention are set forth in the following claims.

We claim:

1. A fuel pressure regulator comprising a housing, a movable diaphragm mounted within said housing, said diaphragm including a first side communicating with the atmosphere and an opposite second side having first and second portions, a fuel chamber partially defined by said first portion of said second side of said diaphragm, a constant pressure chamber closed to the atmosphere partially defined by said second portion of said second side of said diaphragm, fuel inlet means communicating with said fuel chamber, and fuel outlet means including an outlet conduit having an inlet end located adjacent said diaphragm within said fuel chamber and being selectively communicable with said fuel chamber in response to movement of said diaphragm relative to said inlet end.

2. A pressure regulator as set forth in claim 1 and further comprising interengageable valve means on said inlet end of said outlet conduit and on said second side of said diaphragm for closing said outlet conduit when said diaphragm is biased toward said outlet conduit, and for opening said outlet conduit to said fuel chamber when said diaphragm is biased away fom said outlet conduit.

3. A pressure regulator as set forth in claim 2 and further comprising means for varying the pressure of fuel in said fuel chamber independently of atmospheric pressure.

4. A pressure regulator as set forth in claim 3 wherein said fuel pressure varying means includes means for applying a force to said diaphragm so as to bias said diaphragm away from said outlet conduit.

5. A pressure regulator as set forth in claim 4 wherein said means for applying a force to said diaphragm includes a spring.

6. A pressure regulator as set forth in claim 4 and further comprising means for varying the value of said force applied to said diaphragm.

7. A pressure regulator as set forth in claim 3 wherein said fuel pressure varying means includes means for applying a force to said diaphragm so as to bias said diaphragm toward said outlet conduit.

8. A pressure regulator as set forth in claim 1 wherein said housing and said second side of said diaphragm define a chamber, and wherein said pressure regulator further comprises wall means extending between said housing and said second side of said diaphragm and dividing said chamber into a radially inner chamber forming said fuel chamber and a radially outer chamber forming said constant pressure chamber.

9. A pressure regulator as set forth in claim 1 wherein said constant pressure chamber is a vacuum chamber.

10. A fuel pressure regulator comprising a housing, a movable diaphragm including first and second portions and being mounted within said housing so as to divide said housing into first and second chambers, said first chamber communicating with the atmosphere, a flexible bellows extending between said housing and said diaphragm in said second chamber and dividing said second chamber into a fuel chamber within said bellows and a constant pressure chamber closed to the atmosphere and located outside said bellows, said fuel chamber being partially defined by said first portion of said diaphragm, and said constant pressure chamber being partially defined by said second portion of said diaphragm, fuel inlet means communicating with said fuel chamber, fuel outlet means including an outlet conduit having an inlet end located adjacent said diaphragm within said fuel chamber, interengageable valve means on said inlet end of said outlet conduit and on said diaphragm for closing said outlet conduit when said diaphragm is biased toward said outlet conduit, and for opening said outlet conduit to said fuel chamber when said diaphragm is biased away from said outlet conduit, and means for varying the pressure of fuel in said fuel chamber independently of atmospheric pressure.

11. A pressure regulator as set forth in claim 10 wherein said fuel pressure varying means includes means for applying a force to said diaphragm so as to bias said diaphragm away from said fuel outlet conduit.

12. A pressure regulator as set forth in claim 11 wherein said housing has an exterior, and wherein said means for applying a force to said diaphragm includes a rod having one end connected to said diaphragm in said first chamber, and an opposite end extending outwardly of said housing for reciprocal movement relative to said housing, and a spring positioned between said exterior of said housing and said opposite end of said rod for biasing said opposite end of said rod away from said exterior of said housing.

13. A pressure regulator as set forth in claim 11 wherein said means for applying a force to said diaphragm includes a spring positioned between said housing and said diaphragm in said first chamber for biasing said diaphragm away from said fuel outlet conduit.

14. A pressure regulator as set forth in claim 11 and further comprising means for varying the value of said force applied to said diaphragm.

15. A pressure regulator as set forth in claim 10 wherein said fuel pressure varying means includes means for applying a force to said diaphragm so as to bias said diaphragm toward said outlet conduit.

16. A pressure regulator as set forth in claim 10 wherein said constant pressure chamber is a vacuum chamber.

17. A fuel pressure regulator comprising a housing forming a chamber and having opposite first and second generally closed ends, a movable diaphragm including opposite first and second sides each having an area $A_D$, said second side of said diaphragm including a radially inner portion having an area $A_F$, and a radially outer portion, said diaphragm being mounted within said housing and dividing said housing into first and second chambers, said first chamber being located between said first side of said diaphragm and said first end of said housing and communicating with the atmosphere so that said first chamber is at atmospheric pressure $P_A$, said second chamber being located between said second side of said diaphragm and said second end of said housing, a flexible bellows extending between said second end of said housing and said second side of said diaphragm and dividing said second chamber into a radially inner fuel chamber within said bellows and a radially outer vacuum chamber outside said bellows, said fuel chamber being partially defined by said radially inner portion of said second side of said diaphragm, and said vacuum chamber being partially defined by said radially outer portion of said second side of said diaphragm, fuel inlet means communicating with said fuel chamber, fuel outlet means including an outlet conduit having an inlet end located adjacent said diaphragm within said fuel chamber, interengageable valve means on said inlet end of said outlet conduit and on said diaphragm for closing said outlet conduit when said diaphragm is biased toward said outlet conduit, and for opening said outlet conduit to said fuel chamber when said diaphragm is biased away from said outlet conduit, and means for applying a force F to said diaphragm so as to bias said diaphragm away from said fuel outlet conduit, whereby fuel flowing into said fuel chamber through said fuel inlet means flows out of said fuel chamber through said fuel outlet conduit when the pressure of the fuel in said fuel chamber is greater than $P_A A_D/A_F - F/A_F$.

18. A pressure regulator as set forth in claim 17 wherein said means for applying a force to said diaphragm includes a spring positioned between said first end of said housing and said first side of said diaphragm for biasing said diaphragm away from said fuel outlet conduit.

19. A pressure regulator as set forth in claim 17 wherein said housing has an exterior, and wherein said means for applying a force to said diaphragm includes a rod having one end connected to said first side of said diaphragm, and an opposite end extending outwardly of said first end of said housing for reciprocal movement relative to said housing, and a spring positioned between said exterior of said first end of said housing and said opposite end of said rod for biasing said opposite end of said rod away from said exterior of said first end of said housing.

20. A pressure regulator as set forth in claim 17 and further comprising means for varying the value of said force applied to said diaphragm.

* * * * *